Patented Feb. 14, 1928.

1,659,209

UNITED STATES PATENT OFFICE.

JOHN WESLEY MARDEN, OF EAST ORANGE, NEW JERSEY, ASSIGNOR TO WESTINGHOUSE LAMP COMPANY, A CORPORATION OF PENNSYLVANIA.

PRODUCTION OF RARE-METAL POWDERS.

No Drawing. Application filed January 3, 1923. Serial No. 610,516.

This application is a continuation in part of my application, Serial No. 435,542, filed January 6, 1921, for an improvement in the reduction of rare metal oxids, assigned to the Westinghouse Lamp Company.

This invention relates to the reduction of oxids, more especially oxids of the rare reoxids, more especially uranium and fractory metals, particularly uranium and thorium, by means of other metals.

In the patent application previously referred to, the method described therein comprises forming a mixture of the oxide of the metal to be reduced and magnesium powder in the proportions of about 100 grams of the former to about 45 grams of the latter. This mixture is placed in a bomb. The bomb is then evacuated or provided with an atmosphere of hydrogen by connecting an inlet in the cap of the bomb with any convenient form of device for forcing hydrogen into the bomb. The air is permitted to pass out and the hydrogen to take the place thereof. The bomb is thereafter sealed. Heat is applied to start the reaction which progresses, without any continued application of said heat, by means of the heat of the reaction. By means of this method, after the reaction is complete, the products thereof consist of the raremetal powder, magnesium oxide and magnesium mixed together.

The rare-metal powder is extracted by removal of the magnesium oxide and magnesium by treating the mixture several times with water and then with dilute acids. The metal powder is then washed with water to remove the acid and dried by means of alcohol and ether.

In opening the bomb, it is obvious that the air will come in contact with the reduced metal which causes, if the metal is very active, the formation of oxides, etc., thereof. Furthermore, the nature of the reaction and its progress within the bomb is such as to produce a rare-metal powder of considerable fineness, making it difficult to filter and handle.

In order to provide a process which will prevent contamination of the metal powder after its reduction and during its removal from the bomb and to obtain also a coarser grade of metal powder, the process hereinafter described and constituting the subject matter of my invention has been devised.

In my improved process, I find it desirable to employ, in conjunction with the reducing agent, for example, magnesium, a fluxing agent, such as a salt, for instance, calcium chloride. This fluxing agent and the magnesium probably interact to some extent to form magnesium chloride and calcium, thus providing an additional reducing agent. At the same time, the magnesium chloride produced by this reaction probably combines with the rare-metal oxide to form a chloride of the rare metal and magnesium oxide. As the chloride of the rare metal is more easily reduced than the oxide, it is obvious that the rare metal is more easily obtained. A further feature of the employment of the fluxing agent is that, during the reaction, the calcium chloride fuses and finally becomes a liquid which collects over the rare-metal powder, the latter settling to the bottom of the bomb. Upon cooling, the calcium chloride sets into a very hard mass and thus protects the powder, upon opening of the bomb, from direct contact with the air.

As the process progresses, the reaction takes place in successive stages and rather slowly so that the quality of the powder produced is relatively coarse. In subsequently converting the powder into the coherent condition, it is found that a coarse powder lends itself to being pressed into a slug more readily than a fine powder.

The proportions of magnesium and magnesium chloride must of necessity depend upon the temperature to which the mixture is heated, which oxide of uranium is used, and the like.

A specific example of the process, as applied to the production of uranium powder is as follows. 50 grams of uranium oxide is mixed with 50 grams of magnesium powder and 100 grams of calcium chloride. The proportions of magnesium and calcium chloride should be such as to show a 50% excess of the magnesium over the theoretical quantity required by the equation. The ingredients are intimately mixed and thereafter placed in a bomb. The bomb is fitted with an inlet in the cap thereof and hydrogen is passed in therethrough to displace the air before the bomb is finally sealed. After sealing, heat is applied externally to start the reaction which progresses without further application of heat, by means of the heat of reaction. If desired, the bomb may be evacuated, or, if a sufficient excess of the reducing metal is used, it need merely be sealed.

It is desirable, in order to carry out the process successfully, that a fairly high pressure of magnesium vapor be obtained for, unless this condition prevails, the magnesium vaporizes before the reduction is complete. Therefore, it is preferable, in forming the mixture, to use a 50% excess of magnesium over the theoretical quantity required by the equation. The reaction takes place somewhat as follows and may be represented by the following equations, uranium oxide ($UO_2$) being employed as the specific example of a rare refractory oxide, 1. $Mg + CaCl_2 \rightleftharpoons MgCl_2 + Ca$.
2. $2MgCl_2 + UO_2 \rightleftharpoons UCl_4 + 2MgO$.
3. $UCl_4 + Mg + Ca \rightarrow U + MgCl_2 + CaCl_2$.

The reaction between the magnesium and calcium progresses and produces magnesium chloride and calcium. The magnesium chloride, as indicated in equation 2, combines with uranium oxide to provide uranium chloride and magnesium oxide and, as indicated in equation 3, the uranium chloride is reduced by the magnesium present and the calcium produced by the first reaction. The first reaction does not progress any further to the right until the magnesium chloride has been removed by combination with uranium oxide, as in equation 2. Upon removal of the magnesium chloride in this manner, the reaction in equation 1 continues so that the reactions are successfully performed and progress slowly. Because of the slowness of the progress of the reaction, a relatively coarse uranium powder is produced. During the reaction, the calcium chloride will melt and form a liquid seal over any uranium powder which is formed; the latter, because of its higher specific gravity falling to the bottom of the bomb. The calcium chloride thus protects the metal powder so that, after the bomb has cooled and is opened up for removal of the contents, the air is prevented from coming into contact with the pure powder.

While the foregoing theory is offered as a probable explanation of the process by which metallic oxides are reduced, it is to be understood that an interpretation of my invention is not to be based on such theory which, although plausible in the light of present knowledge, may yet prove to be different from the actual mechanics of the reaction.

Although the method above described is applied specifically to the production of uranium, it may be utilized in the production of other rare refractory-metal powders with perhaps minor modifications therein well known to those skilled in the art. Therefore, I contemplate any modifications or extensions of the invention which fall within the scope of the appended claims.

What is claimed is:

1. The method of producing rare refractory metals which comprises heating an oxide of the rare refractory metal to be formed with magnesium and a fluxing agent.

2. The method of producing rare refractory metal powders which comprises heating an oxide of the metal to be formed with magnesium and calcium chloride.

3. The method of producing uranium which comprises heating an oxide of uranium with magnesium and a fluxing agent.

4. The method of producing uranium which comprises heating an oxide of uranium with magnesium and calcium chloride in an inert atmosphere.

5. The method of producing uranium which comprises heating an oxide of uranium with magnesium and calcium chloride in an atmosphere of hydrogen.

6. The method of producing uranium powder which comprises heating an oxide of uranium powder with magnesium and calcium chloride, said magnesium being in excess of the theoretical quantity required by the equation.

7. The method of producing uranium powder which comprises heating an oxide of uranium powder with magnesium and calcium chloride, said magnesium being in 50% excess of the theoretical quantity required by the equation.

8. The method of producing coarse uranium powder which comprises forming an intimate mixture of uranium oxide, magnesium and calcium chloride, placing said mixture in a bomb, providing said bomb with a hydrogen atmosphere, sealing said bomb, heating to start the reaction and after said reaction is completed allowing said bomb to cool and thereafter removing the contents thereof.

In testimony whereof, I have hereunto subscribed my name this second day of January 1923.

JOHN WESLEY MARDEN.